United States Patent [19]

Fukuda et al.

[11] Patent Number: 5,161,427

[45] Date of Patent: Nov. 10, 1992

[54] POLY(AMIDE-IMIDE) LINER

[75] Inventors: Diane P. Fukuda, Jaffrey; Arthur S. Eldredge, Jr., Peterborough; Thomas F. Buck, Keene, all of N.H.

[73] Assignee: Teleflex Incorporated, Limerick, Pa.

[21] Appl. No.: 789,618

[22] Filed: Nov. 8, 1991

Related U.S. Application Data

[63] Continuation of Ser. No. 608,371, Nov. 2, 1990, abandoned, which is a continuation of Ser. No. 419,909, Oct. 11, 1989, abandoned, which is a continuation-in-part of Ser. No. 253,547, Oct. 7, 1988, abandoned, which is a continuation-in-part of Ser. No. 111,867, Oct. 23, 1987, abandoned.

[51] Int. Cl.$^5$ .................... F16C 1/10; B29D 23/22; B32B 1/08; C08L 79/08

[52] U.S. Cl. .................... 74/502.4; 74/502.5; 138/118.1; 174/110 FC; 428/36.91; 464/7; 464/52; 464/173; 464/174; 464/903; 525/180

[58] Field of Search .................... 74/502.5, 502.3, 500.5, 74/502.4; 525/189, 180, 429; 428/36.9, 375, 377, 36.91; 138/118.1; 174/110 FC; 464/174, 7, 52, 903, 173

[56] References Cited

U.S. PATENT DOCUMENTS

| | | | |
|---|---|---|---|
| 2,626,223 | 1/1953 | Sattler et al. | 525/429 X |
| 2,946,763 | 7/1960 | Bro et al. | 174/110 FC |
| 3,150,207 | 9/1964 | Gore | 174/110 FC |
| 3,369,426 | 2/1968 | Matz, Jr. | 74/502.5 |
| 3,434,501 | 3/1969 | Conrad | 74/502.5 X |
| 3,554,050 | 1/1971 | Conrad | 74/502.5 |
| 3,555,113 | 1/1971 | Sattler | 525/429 |
| 4,026,863 | 5/1977 | Iseki et al. | 525/189 X |
| 4,088,156 | 5/1978 | Kubo et al. | 74/502.5 X |
| 4,099,425 | 7/1978 | Moore | 74/502.5 |
| 4,112,708 | 9/1978 | Fukuda | 74/502.5 X |
| 4,139,576 | 2/1979 | Yoshimura et al. | 525/180 X |
| 4,143,204 | 3/1979 | Fang | 428/413 |
| 4,300,408 | 11/1981 | Yoshifuji | 74/501 |
| 4,362,069 | 12/1982 | Giatras et al. | 74/502.5 |
| 4,390,590 | 6/1983 | Saunders et al. | 428/383 |
| 4,451,616 | 5/1984 | Kawachi et al. | 525/180 X |
| 4,478,913 | 10/1984 | Pauze | 428/375 X |
| 4,599,383 | 7/1986 | Satoji | 528/180 |
| 4,666,762 | 5/1987 | Yamamoto | 428/418 X |
| 4,703,075 | 10/1987 | Egami | 524/269 |

FOREIGN PATENT DOCUMENTS

| | | |
|---|---|---|
| 313416 | 4/1989 | European Pat. Off. |
| 1207304 | 9/1970 | United Kingdom .............. 74/502.5 |

Primary Examiner—James J. Seidleck
Assistant Examiner—Vasu S. Jagannathan
Attorney, Agent, or Firm—Reising, Ethington, Barnard, Perry & Milton

[57] ABSTRACT

A motion transmitting remote control assembly (10) for transmitting motion in a curved path including a liner (12) disposed within a conduit (16) and a motion transmitting core element (14) moveably supported by the liner (12). The liner (12) is made essentially of polytetrafluoroethylene (PTFE). The assembly (10) is characterized by the liner (12) further including poly(amide-imide) for increasing the strength and lubricity thereof. Preferably, the liner comprises 97 weight percent polytetrafluoroethylene and 3 weight percent poly(amide-imide).

7 Claims, 4 Drawing Sheets

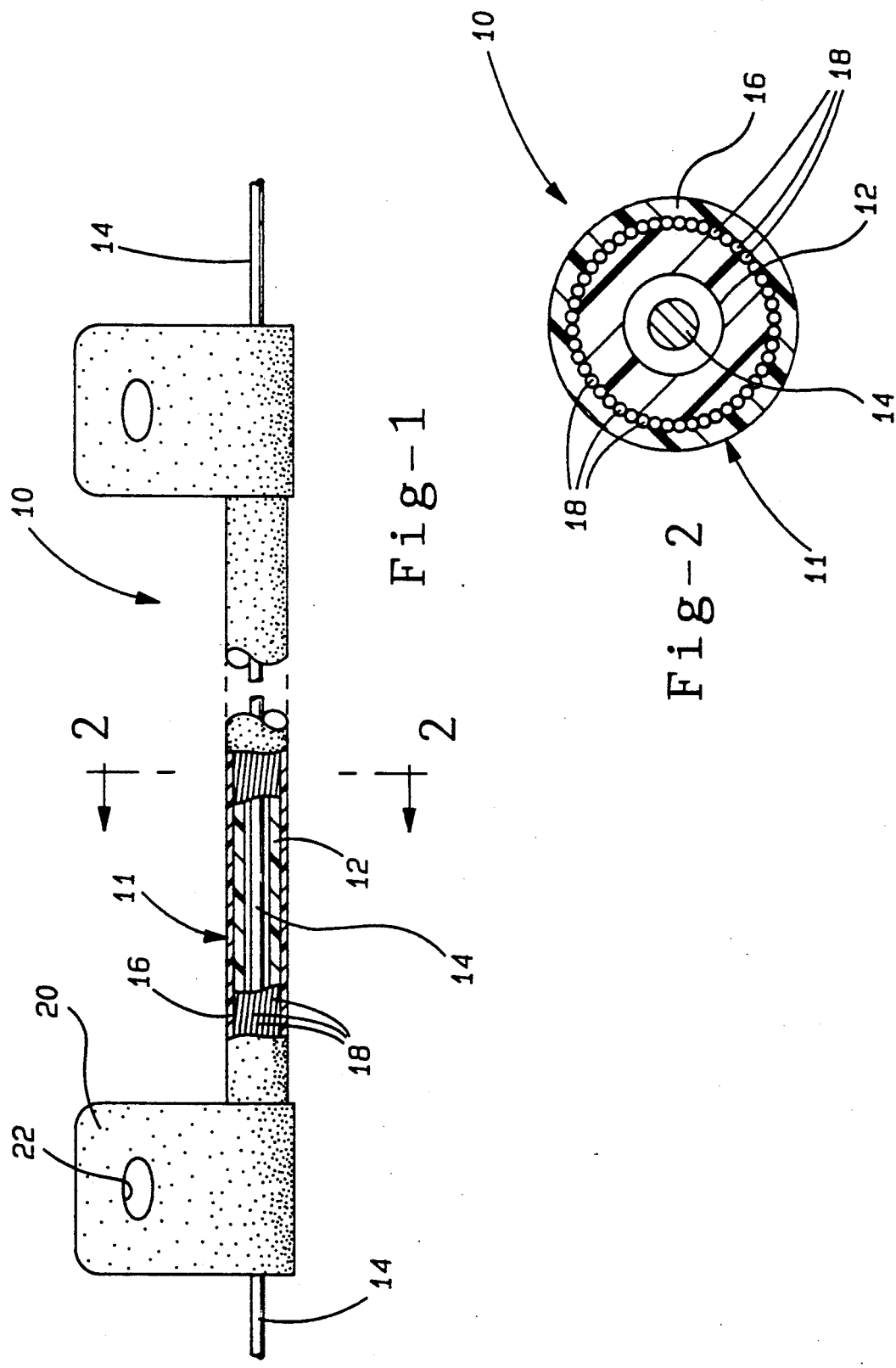

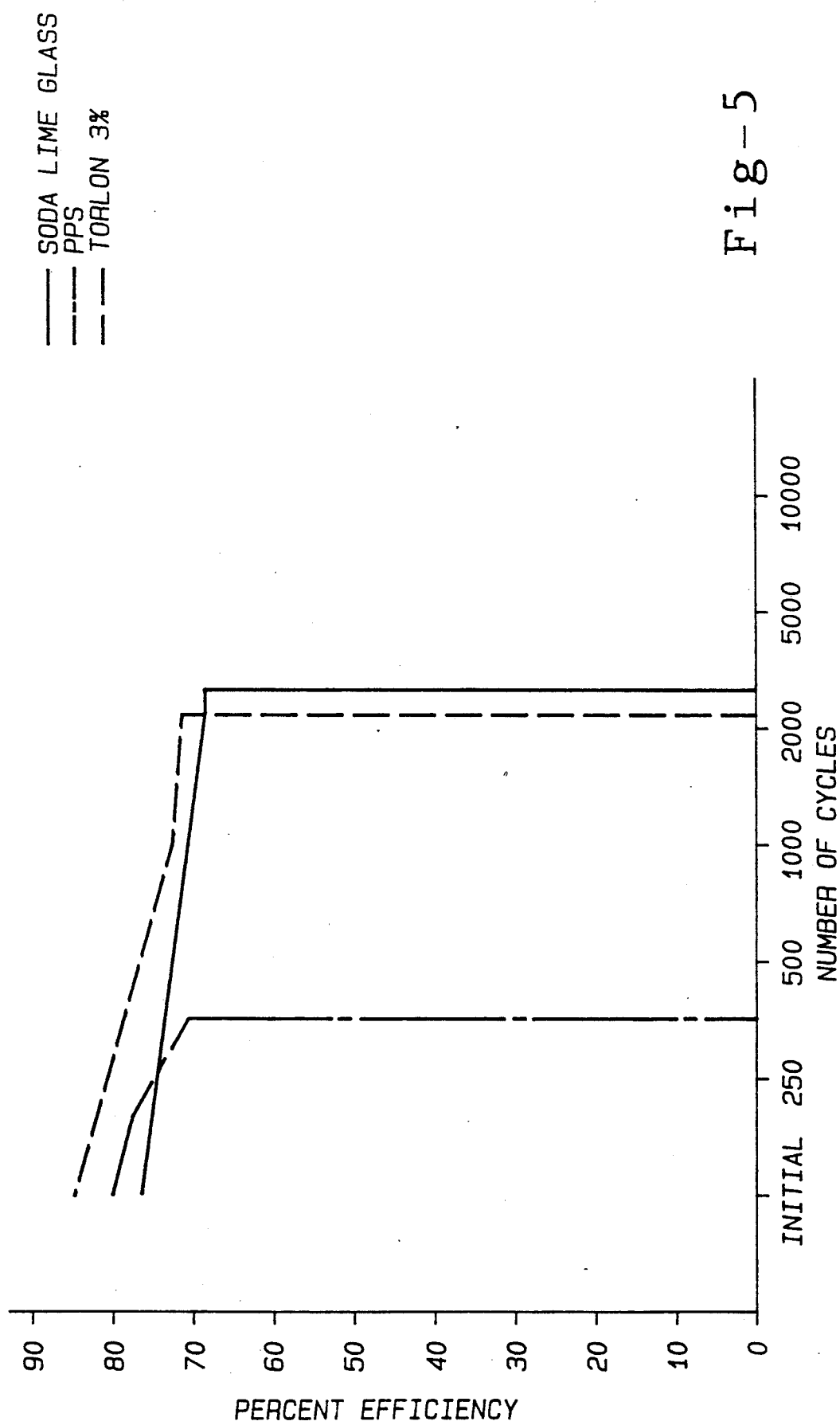

POLY(AMIDE-IMIDE) LINER

RELATED APPLICATIONS

This application which is a continuation of application Ser. No. 608,371, filed Nov. 2, 1990 abandoned; which is a continuation of Serial No. 419,909 filed Oct. 10, 1989 ; abandoned. which is a continuation-in-part of application Ser. No. 253,547, filed Oct. 7, 1988 (now abandoned), which is a continuation-in-part of application Ser. No. 111,867, filed Oct. 23, 1987, (now abandoned).

TECHNICAL FIELD

This invention relates to a motion transmitting remote control assembly for transmitting motion in a curved path by a flexible motion transmitting core element. More particularly, this invention relates to liners for supporting the core element in such motion transmitting assemblies.

BACKGROUND ART

Remote control assemblies utilizing liners are well known in the prior art. Such assemblies are typically used in automotive, marine, and aviation environments. Typically, a core element, which comprises a wire member or a plurality of metallic strands helically wound together in cable-like fashion, is disposed within the liner and adapted for longitudinal movement therein. Similarly, the movement of the core element within the liner may be rotational as in the case of a speedometer cable. The core element as it moves in the liner, produces frictional forces which abrade the interior of the liner, eventually resulting in failure or wear unacceptable of the liner.

U.S. Pat. No. 4,362,069 issued Dec. 7, 1982 to Giatras et al discloses a liner wherein polytetrafluroethylene (PTFE) is coextruded with an arylene sulfide polymer to produce a liner having improved wear and friction characteristics. Additives, such as lubricating fluids or glass are also included in the composite prior to extrusion to produce a liner with the desired properties.

SUMMARY OF INVENTION AND ADVANTAGES

The present invention provides a remote control assembly of the type for transmitting motion in a curved path comprising a liner made of a fluorocarbon polymer, and a core element adapted for movement within the liner. The assembly is characterized by the liner including poly(amide-imide) for increasing the strength and lubricity thereof.

Accordingly, the present invention provides a liner having increased wear and friction characteristics. Further, the present invention is advantageous in that it needs no additives (such as lubricating fluids or glass) for improving the lubricity and wear resistance of the liner.

FIGURES IN THE DRAWINGS

Other advantages of the present invention will be readily appreciated as the same becomes better understood by reference to the following detailed description when considered in connection with the accompanying drawings wherein:

FIG. 1 is a fragmentary plan view partially in cross-section of a remote control assembly made in accordance with the present invention;

FIG. 2 is a cross-sectional view taken along lines 2—2 of FIG. 1;

FIG. 5 is a graphical representation of further test results of liners made in accordance with the present invention.

DETAILED DESCRIPTION OF THE DRAWINGS

Figure 3:
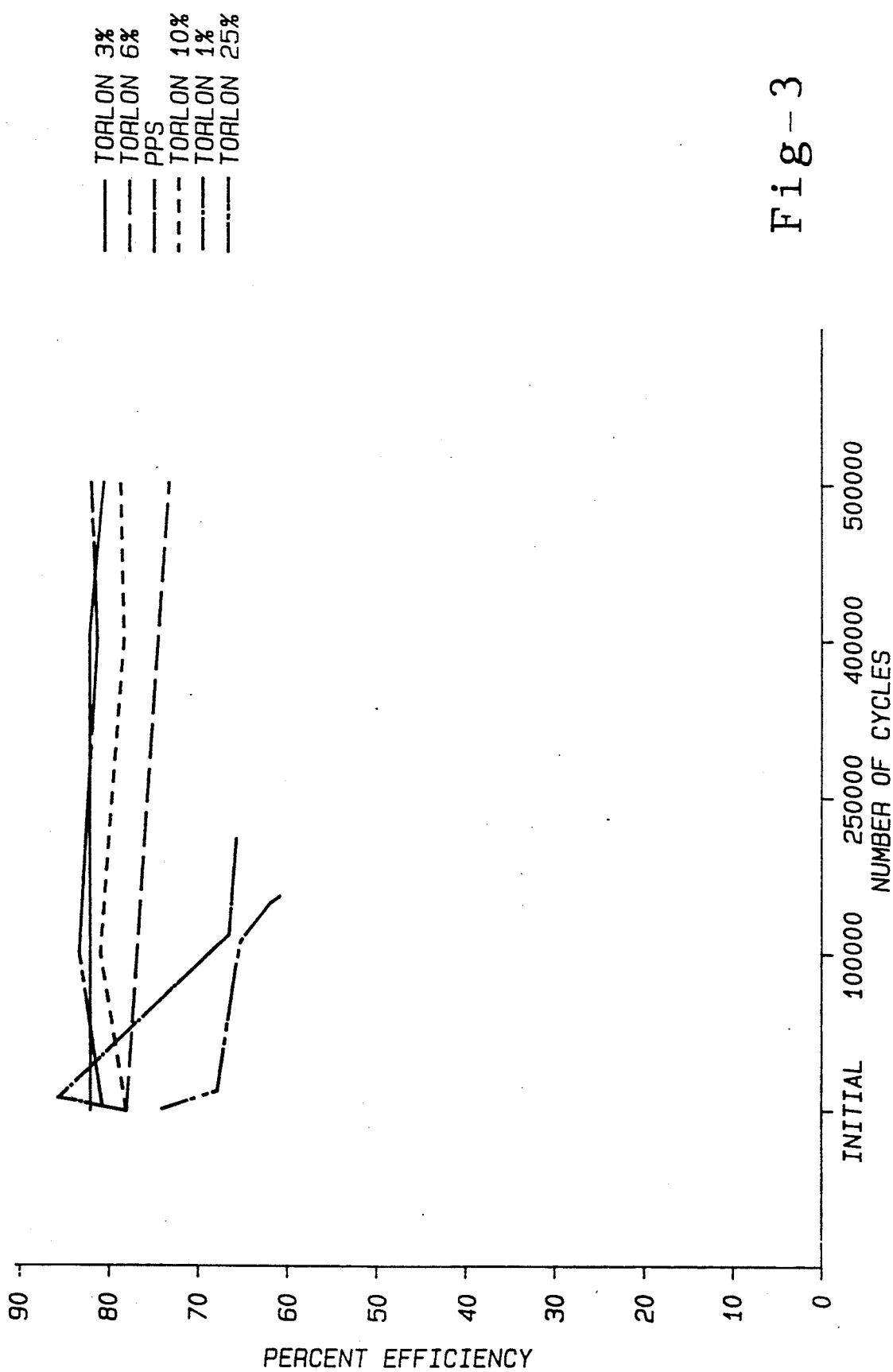
FIG. 3 is a graphical representation of test results of liners made in accordance with the present invention.

Referring to the drawings, a remote control assembly of the type for transmitting motion in a curved path is generally shown at 10 in the FIGS.

The assembly 10 includes a liner 12. The liner 12 is generally circular in cross-section and is made essentially of polytetrafluroethylene (PTFE). PTFE is sold under the trademark TEFLON by Dupont. The liner 12 is disposed within a conduit generally indicated at 11. The conduit 11 may be any one of various configurations, however, it preferably includes a plurality of long lay wires 18 having a casing 16 extruded thereabout.

The assembly further includes a core element 14. The core element 14 can be a wire member, or a plurality of metallic strands helically wound together in a cable-like fashion. The core element is adapted for movement within the liner. This movement may either be longitudinal, i.e., in the same direction as the liner 12, or rotational as in a speedometer cable. Further, the core element may have a coupling member (not shown) disposed about the end thereof to attach the core element 14 to an operated or operating member.

The assembly 110 further includes mounting means for securing the conduit to a support structure (not shown). The mounting means comprises a flange 20 extending from the conduit 11. A hole 22 is provided in the flange 20 for securing the flange 20 with a support structure.

The assembly 10 is characterized by the liner 12 including poly(amide-imide). Poly(amide-imide) is commercially available from the Amoco Chemical Company and is sold under the trademark TORLON. A liner 12 is made by preparing a substantially uniform composite of PTFE and poly(amide-imide). The composite is blended until the poly(amide-imide) is dispersed substantially uniformaly throughout the PTFE. The composite is then extruded to form the liner 12 which has the poly(amide-imide) dispersed substantially uniformaly throughout the entire liner 12. Such extrusion not utilizing melt forming is termed "paste extrusion". The liner 12 comprises between 75 weight percent and 99 weight PTFE and between 25 weight percent and 1 weight percent poly(amide-imide), respectively. Preferably, the liner comprises 97 weight percent of PTFE and 3 weight percent poly(amide-imide). Conduits made in accordance with the present invention result in a strong product having high abrasion and friction (i.e , lubricity) resistances.

Five liners made in accordance with the subject invention were made and tested. These lines contained 1, 3, 6, 10, 25 weight percent poly(amide-imide), respectively. Also, a liner made using PTFE and an arylene sulfide polymer, labeled PPS in FIGS. 3 and 4, was made and tested. The first test (results in FIG. 3) consisted of forming a liner 12 into a "S" shape. A core element 14 was lubricated with a suitable lubricant. A small loop was made in one end of the core element for attaching five pounds of weight thereto. The core element was then reciprocated through the liner at a rate of sixty cycles per minute. One cycle consisted of drawing the core element in a forward direction a distance of one and five-eighths inches, and then returning the core element to its initial position. The 3, 6 and 10 weight percent poly(amide-imide) liners were run through approximately 500,000 cycles. The 1 and 25 weight percent liners were run through approximately 220,000 cycles.

The frictional efficiencies were measured at various intervals of cycles as follows: one end of the core element is connected to a transducer. A five pound weight was connected to the other end. The core element was cycled through the liner at a rate of four cycles per minute. The actual loads required to raise the five pound weight, as measured by the transducer, were recorded for three cycles and averaged. To calculate the frictional efficiency the following equation was used:

$$\text{Efficiency} = (5 \text{ lbs/average actual load}) \times 100$$

The test results are plotted in FIG. 3. As shown, all of the liners made in accordance with the present invention had an efficiency of greater than 60%. The 1 weight percent poly(amide-imide) conduit represents the lower effective concentration limit of poly(amide-imide). That is, if less than 1 weight percent is used, the conduit does not have the necessary abrasion resistance and abrades too rapidly. The 25 weight percent poly(amide-imide) conduit represents the upper effective concentration limit. If more than 25 weight percent poly(amide-imide) is used, the TEFLON portion of the conduit forms insufficiently, resulting in a conduit which abrades too easily.

The second test consisted of passing a core element 14 through a trough formed by utilizing a half of a liner (a liner cut along the longitudinal axis). Thirty-six pounds of weight were applied to one end of the core element. The core element was then lubricated and reciprocated through the trough a distance of approximately one and seven-sixteenths inches at a rate of thirty cycles per minute.

The frictional efficiency was measured at various intervals of cycles as follows: a tension force transducer was connected to one end of the core element. A known weight was connected to the other end of the core element. The core element was then reciprocated through approximately one and seven sixteenths inches at a rate of two cycles per minute. The actual force required to raise the weight (FR) and the actual load required to lower the weight (FL) were measured and averaged over three cycles. The efficiency was then calculated using this following formula:

$$\text{Efficiency} = \sqrt{\frac{FL}{FR}} \times 100$$

Figure 4:
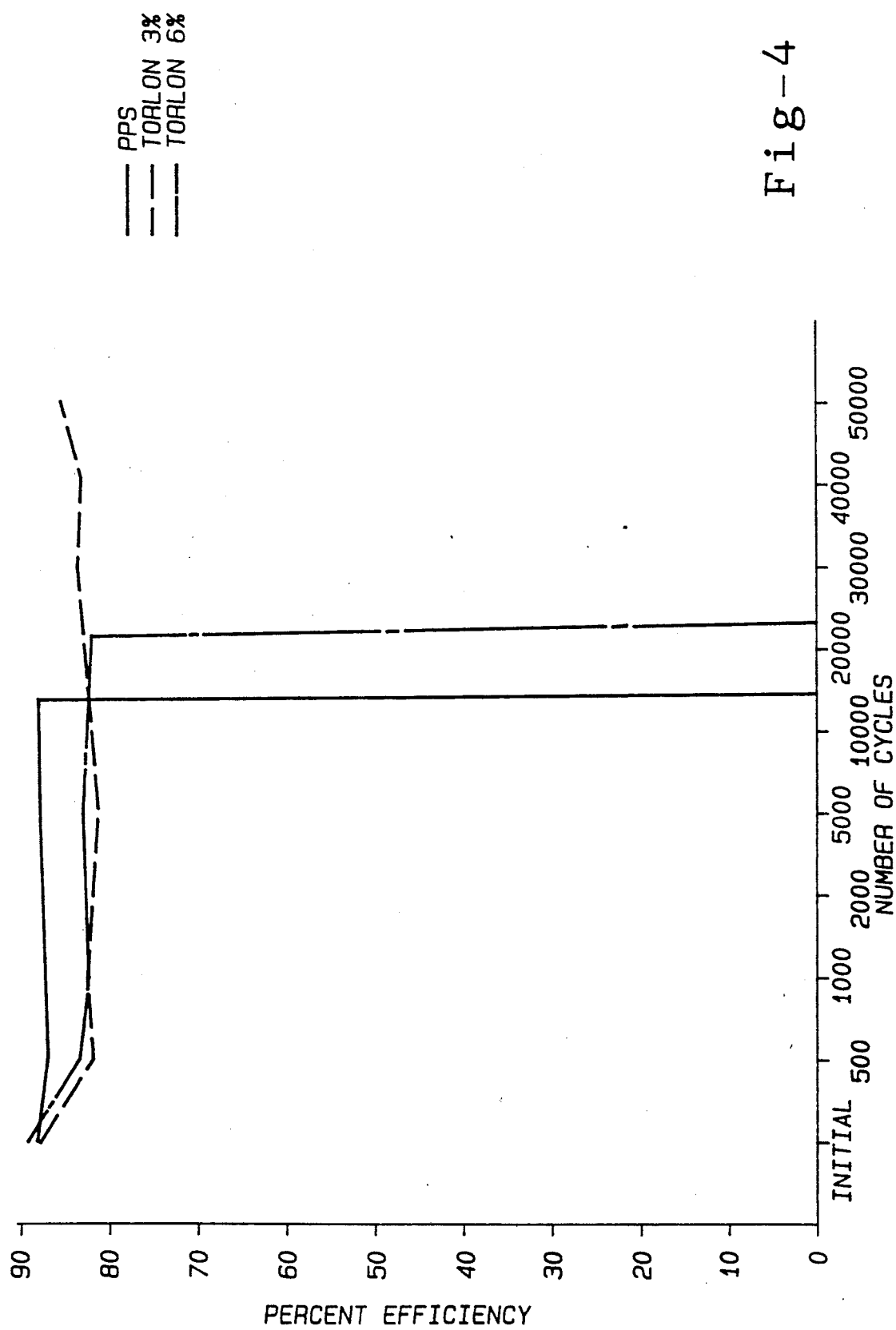
FIG. 4 is a graphical representation of further test results of liners made in accordance with the present invention.

The results are plotted in FIG. 4. As demonstrated by the FIG. the liners made in accordance with the invention having between 3 and 10 weight percent poly(amide-imide) had an efficiency of over 75% at every cycle interval. Except the conduit containing 6 weight percent poly(amide-imide) failed at approximately 22,000 cycles. Also, the PPS liner failed, i.e., wore through, at approximately 19,000 cycles. The one percent and twenty-five percent poly(amide-imide) liners were not subjected to the arc test.

FIG. 5 shows the results of another arc test which was preformed in the manner described above, with the exception that no lubricant was used. As indicated, the liner 12 made in accordance with the instant invention exhibited a high lubricity (several cycles were achieved before failure).

As indicated by the results of the tests, the liners produced using between 1 and 25 weight percent poly(amide-imide) and between 99 and 75 weight percent polytetrafluroethylene, respectively, have greater strength, abrasion resistance, and lubricity then those liners which were previously available as made by prior art methods.

Poly(amide-imide) filled liners exhibit comparable lubricity in a lubricated S-test to prior liners. These liners exhibit superior wear resistance in the arc test. In addition, these liners demonstrate superior lubricity and wear resistance in the arc test when preformed without lubrication.

The invention as been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A remote control assembly (10) of the type for transmitting motion in a curved path, said assembly (10) comprising: a conduit (11); a liner (12) made of a fluorocarbon polymer disposed in said conduit (11); and a core element (14) adapted for movement within said liner (12), said assembly (10) characterized by said liner (12) including poly(amide-imide) dispersed substantially uniformly throughout the fluorocarbon polymer for increasing the strength and lubricity of the liner (12), said liner (12) comprising between 75 weight percent and 99 weight percent fluorocarbon polymer and between 25 weight percent and one weight percent poly(amide-imide) respectively.

2. An assembly as set forth in claim 1 wherein said liner (12) comprises between 90 weight percent and 97 weight percent fluorocarbon polymer and between 10 weight percent and 3 weight percent poly(amide-imide) respectively.

3. An assembly as set forth in claim 2 wherein said liner (12) comprises 97 weight percent fluorocarbon polymer and 3 weight percent poly(amide-imde).

4. An assembly as set forth in claim 1 wherein said fluorocarbon polymer is polytetrafluoroethylene.

5. An assembly as set forth in claim 1 wherein said conduit (11) comprises a plurality of long lay wires (18) having a casing (16) extruded thereabout.

6. An assembly as set forth in claim 5 wherein said assembly (10) includes mounting means for mounting said conduit (11) to a support structure.

7. An assembly as set forth in claim 6 wherein said mounting means comprises a flange (20) extending from said conduit (11).

* * * * *